(12) United States Patent
Beierle (10) Patent No.: US 7,955,584 B2
(45) Date of Patent: Jun. 7, 2011

(54) METHOD OF PRODUCTION OF CHARCOAL, CONDITIONED FUEL GAS AND POTASSIUM FROM BIOMASS

(75) Inventor: Fred P. Beierle, Prosser, WA (US)

(73) Assignee: CSA Energy Inc., Hickman, KY (US)

( * ) Notice: Subject to any disclaimer, the term of this patent is extended or adjusted under 35 U.S.C. 154(b) by 679 days.

(21) Appl. No.: 11/525,592

(22) Filed: Sep. 22, 2006

(65) Prior Publication Data

US 2007/0014713 A1     Jan. 18, 2007

Related U.S. Application Data

(62) Division of application No. 10/669,666, filed on Sep. 23, 2003, now Pat. No. 7,226,566.

(51) Int. Cl.
    *C01B 31/02*     (2006.01)
(52) U.S. Cl. ............ 423/445 R; 44/500; 44/605; 44/606
(58) Field of Classification Search .............. 423/445 R; 44/500, 605, 606
See application file for complete search history.

(56) References Cited

U.S. PATENT DOCUMENTS 4,530,702 A * 7/1985 Fetters et al. ................... 48/209
* cited by examiner

*Primary Examiner* — Stuart Hendrickson
(74) *Attorney, Agent, or Firm* — Floyd E. Ivey; Ivey Law Offices., P.S. Corp.

(57) ABSTRACT

The invention provides a process for the production of charcoal, fuel gas, and potassium from a biomass gassifier.

9 Claims, 5 Drawing Sheets

METHOD OF PRODUCTION OF CHARCOAL, CONDITIONED FUEL GAS AND POTASSIUM FROM BIOMASS

This is a Divisional Application from Continuation-in-Part application Ser. No. 10/669,666 filed Sep. 23, 2003, now U.S. Pat. No. 7,226,566 which is pending from patent application 10/254,950 to Fred P. Beierle and entitled METHOD OF PRODUCING CHARCOAL FROM BIOMASS, CONDITIONED FUEL GAS AND POTASSIUM FROM BIOMASS.

FIELD OF THE INVENTION

This invention relates to the production of charcoal and fuel gas for combustion engines. More particularly, this invention relates to the maximization of charcoal production with the production of fuel gas as a secondary consideration. Fuel gas is conditioned for use in combustion engines.

BACKGROUND OF THE INVENTION

This invention relates generally to the art of producing charcoal, and secondarily fuel gas, from organic material, and more particularly concerns an apparatus and method in such art which is self-sustaining in operation.

The use, per se, of a pyrolysis process to convert organic material, such as wood chips, to charcoal and fuel gas is well known, and a wide variety of devices have been designed to accomplish such a result. A primary disadvantage of such devices, including those generally referred to as gasifiers, is that a substantial produced charcoal is substantially consumed. A recognized by-product of the pyrolysis process is tar, which affects both the operation of a gasifier and the end use apparatus of the produced fuel gas, such as an internal combustion engine or other burner. The production of tar is discussed in U.S. Pat. No. 4,268,275 and U.S. Pat. No. 4,421,524 both to Chittick and U.S. Pat. No. 4,530,702 to Fetters et al. The solution regarding tar, disclosed in these patents, included a reaction chamber having a pyrolysis zone followed by a reaction zone comprising a bed of charcoal heated to a high temperature. The high temperature of the charcoal and the catalytic effect of the ash residue on the surface of the hot charcoal break down the tars from the pyrolysis zone into carbon monoxide and hydrogen. The heat for the pyrolysis zone and the reaction zone was provided externally. The issue of minimizing the consumption of charcoal is not addressed. U.S. Pat. No. 4,530,702 to Fetters et al additionally disclose the introduction of steam for increased fuel gas production. The introduction of steam is counterproductive vis-a-vis the production of charcoal increasing the production of carbon fines and production of ash, both having little or no value.

Also noted herein are U.S. patents to Brioni et al, 5,725,738; to Koslow, 5,946,342 and 6,061,384; and Nagle et al, 6,051,096 and 6,124,028.

The patents referred to herein are provided herewith in an Information Disclosure Statement in accordance with 37 CFR 1.97.

SUMMARY OF THE INVENTION

The present invention includes a process for producing charcoal, and secondarily fuel gas, from organic material, in which a charge of charcoal is initially present in a pyrolysis reaction chamber, thus forming a charcoal bed therein, the process being self-sustaining so that it does not require the addition of external heat following initiation of the process, wherein the process comprises the steps of: igniting a portion of the charcoal bed within the pyrolysis reaction chamber, the ignition being substantially uniform over the cross-sectional area of the charcoal bed; moving air through the charcoal bed so that the portion of ignited charcoal becomes sufficiently hot to create a pyrolysis reaction zone in the charcoal bed; adding organic material, typically in the form of pellets or chips or the like, to the reaction chamber on top of the charcoal bed; forming a head of raw unreacted fuel; and establishing and maintaining a zone in the pyrolysis zone in which the combustion is homogeneous, the zone of homogeneous combustion extending over the entire cross-sectional area of the pyrolysis zone. In addition, the steps of igniting, removing charcoal and adding biomass, and with and without the steps of establishing and maintaining, the step of directing additional air into the charcoal from beneath the charcoal bed is added, providing a capability to maximize the production of charcoal and minimize the consumption of charcoal within the apparatus. Disclosed herein is the production of charcoal in a charcoal production bed in a single reaction chamber the production bed comprising in sequence (a) an upper layer of biomass input material, (b) an intermediate pyrolysis zone layer in which the input material is reduced to devolatilized char and pyrolysis volatiles comprising hydrogen, carbon monoxide, methane, nitrogen, water vapor and tars, the intermediate layer being at a temperature within the range of 800degrees C. to 1000 degrees C., and (c) a lower layer comprising substantially only hot charcoal. The gases produced are generally as follows as a percentage of total gas produced: Hydrogen 17-18%; Carbon Monoxide 38%; Methane 2%; with the remainder primarily Nitrogen with some trace gases also present.

Secondarily, the present invention includes an apparatus for converting a biomass input to an output gas which is suitable for use as a fuel gas, wherein the apparatus includes a reaction chamber which is open at its lower end, in which, in operation, a bed of charcoal is present in which in turn is located a pyrolysis reaction zone. The pyrolysis reaction converts the biomass input into fuel gas volatiles and charcoal. Air is drawn down through the reaction chamber from above the pyrolysis zone and fuel gas exits from the apparatus. In contrast to prior art, there is no provision for additional air to be directed into the charcoal bed from below the bed. Such lessens the production of charcoal and operates to the detriment of the purposes of this invention.

Control and instrumentation includes a control motor drive of an auger means for removal of charcoal having instrument means to detect quantities of charcoal to be removed and a control means, including valve means, for use on fuel gas output lines which includes a pressure sampling means for sampling the gas pressure in the output line; control means including control valve means positioned in a return line which, when open, permits recirculation of a portion of the gas in the output line; and control means responsive to the pressure in the output line, as sampled by the sampling means, e.g., pressure transducers having an input to a control valve means, to open the normally closed valve means when the pressure rises above a predetermined valve. Control and instrumentation means include but are not limited to temperature, pressure, level or height and other control and measurement means which may be accomplished, as recognized by those of ordinary skills in the control and measurement arts, with thermocouple and other temperature measurement instruments, pressure transducer and other pressure measurement instruments, stress gages and other stress measurement instruments, light detectors and limit switches and other level measurement instruments having controller inputs to controllers for valve, process and other control functions as are commonly recognized by those of the instrumentation and control arts.

Combustible fuel gas is a by-product of the charcoal production described in the parent application. Fuel gas is discharged to a heat exchanger, a demister, a fuel conditioner and to either storage or combustion in an engine means. A byproduct of the heat exchanging process is water containing potassium usable as an agricultural fertilizer.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 is a cross-sectional diagram of the invention showing a charcoal production bed (10) in a single reaction chamber (30) where the production bed (10) comprises in sequence (a) an upper layer (13) of biomass input material, (b) an intermediate layer (14) pyrolysis zone layer in which the input material is reduced to devolatilized char and pyrolysis volatiles comprising hydrogen, carbon monoxide, water vapor and tars, the intermediate layer being at a temperature within the range of 800 degrees C. to 1000 degrees C., and (c) a lower layer (15) comprising substantially only hot charcoal, the hot charcoal being at a temperature which is sufficiently high to reduce any tars from the pyrolysis zone layer to carbon monoxide and hydrogen; the charcoal production bed having an outlet means (43) for fuel gas. The reaction chamber (30) receives air input (50) at the upper layer (13). Seen is removal means (45), seen here as an auger, for removal of charcoal.

DETAILED DESCRIPTION

Figure 1:
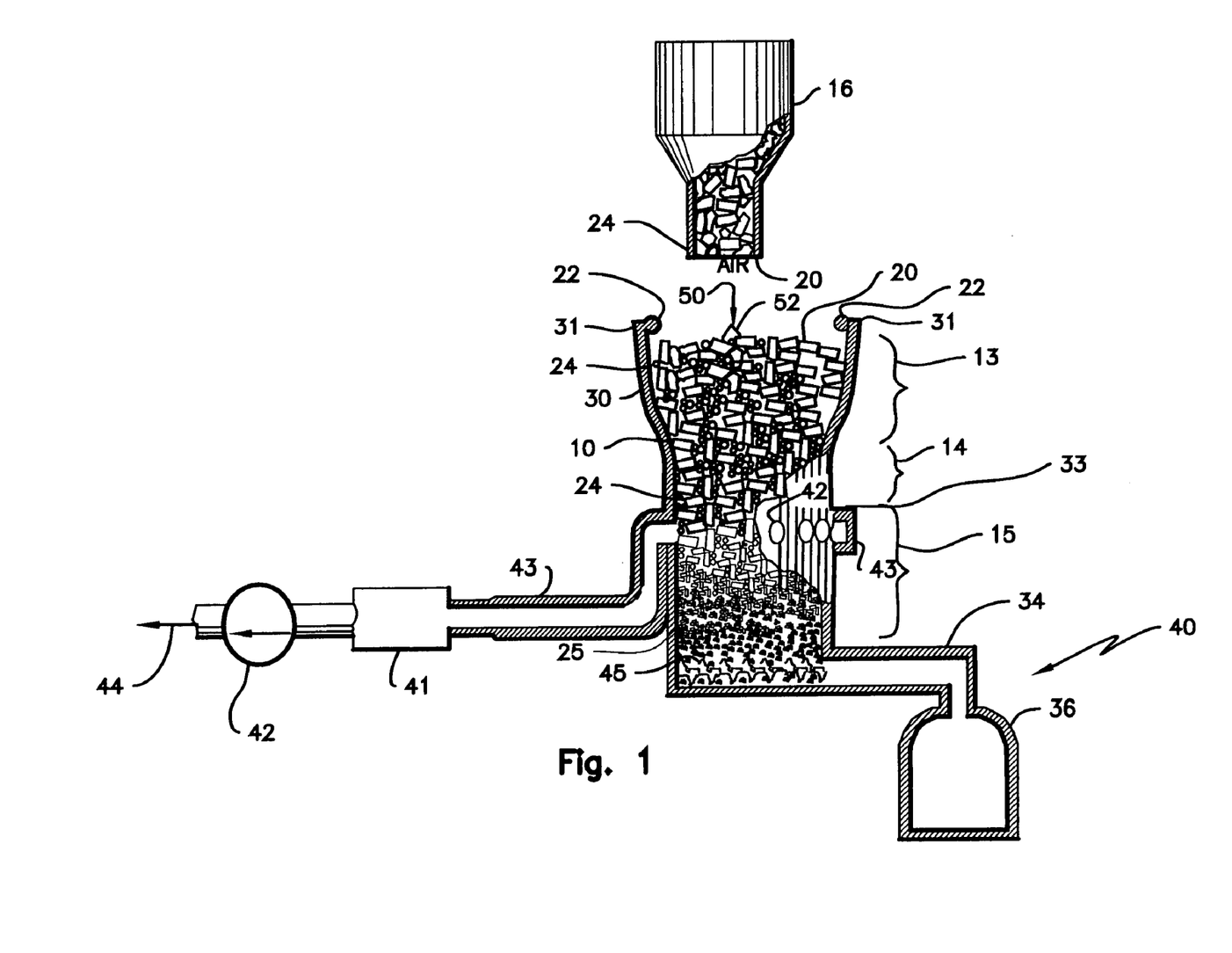
Figure 2:
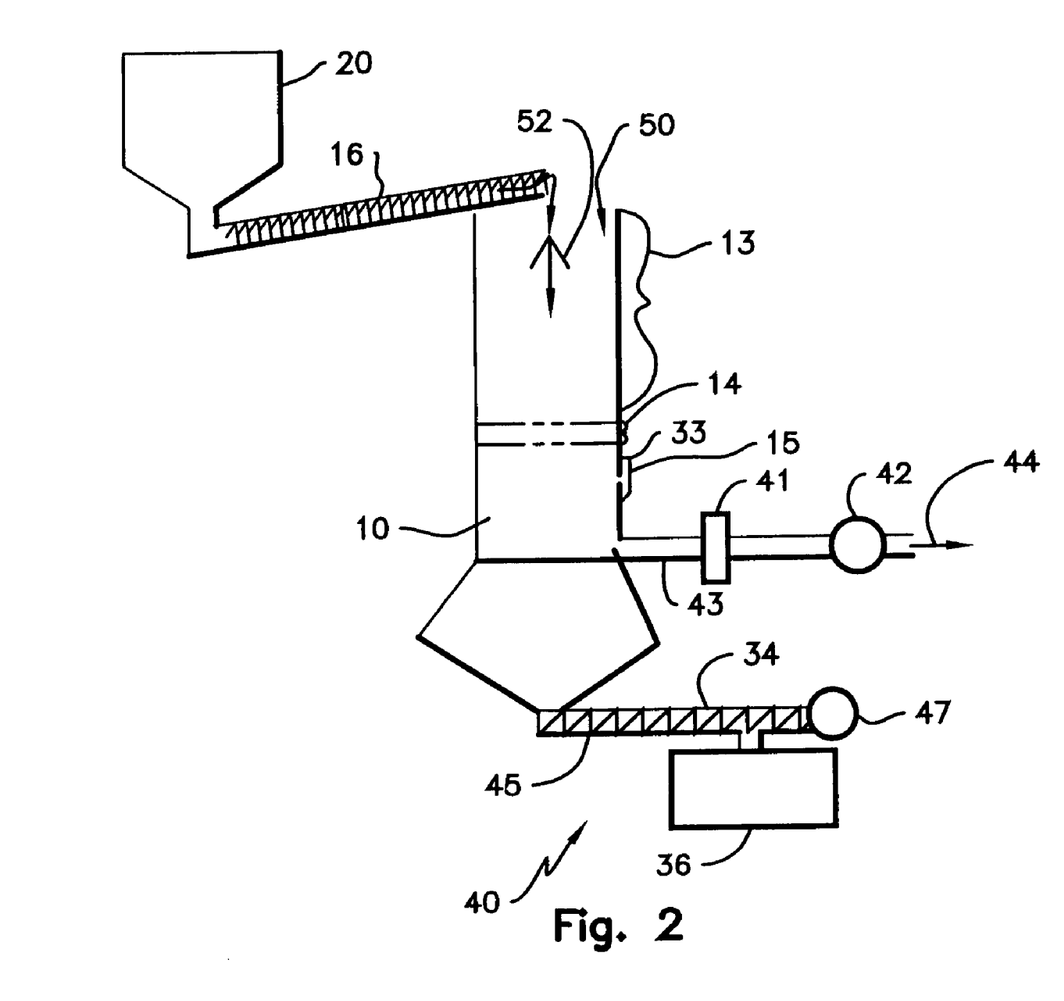
FIG. 2 is a flow diagram of the invention of FIG. 1.

FIG. 1 shows the preferred embodiment of the present invention, which in operation is self-sustaining, in that it requires no external heat source to maintain operation. The reaction chamber (30) may be composed of heat and corrosion resistant materials including, for example, fiber-ceramic insulating material, lined interiorly with unreactive inconel or stainless steel metal, either of which resist attack from oxygen. In the preferred embodiment the reaction chamber will have a circular cross-section but may be formed with a variety of cross-sections. Those of ordinary skills in the heat and corrosion arts will appreciate other materials suitable for the reaction chamber (30).

In the preferred embodiment diameter of the reaction chamber (30) is substantially uniform along its length, except for the uppermost portion or upper layer (13), which may be slightly flared to accommodate a head of biomass (20) which may be comprised, for example, of fuel pellets, vegetable matter and other organic matter as will be appreciated by those of ordinary skill in the art. Biomass (20), in the preferred embodiment is delivered by delivery means (16) into the reaction chamber (30) by an motor controlled auger (16). In the preferred embodiment a light detection means, provided in the preferred embodiment as a electric eye (22), is mounted by mounting means at a top (31) of the reaction chamber (30). The electric eye (22) set provides a switch function electrically communicating with a motor drive for the motor controlled auger (16) causing power to the motor controlled auger (16) when the electric eye (22) detects the absence of biomass. Delivery means (16) may include hoppers, conveyors, augers and other such feed or delivery devices. The preferred embodiment for delivery means (16) is by motor controlled auger (16).

FIG. 1 is a cross-sectional diagram of the invention showing a charcoal production bed (10) in a single reaction chamber (30) where the production bed (10) comprises in sequence (a) an upper layer (13) of biomass input material, (b) an intermediate pyrolysis zone layer (14) in which the input material is reduced to devolatilized char and pyrolysis volatiles comprising hydrogen, carbon monoxide, water vapor and tars, the intermediate layer being at a temperature within the range of 800 degrees C. to 1000 degrees C., and (c) a lower layer (15) comprising substantially only hot charcoal, the hot charcoal being at a temperature which is sufficiently high to reduce any tars from the pyrolysis zone layer to carbon monoxide and hydrogen; the charcoal production bed (10) having an outlet means (43) for fuel gas. Seen is charcoal removal system (40) comprised of removal means (45), shown for example as an auger but which may be provided by a valve controlled chute, screw drive and other lift or moving devices; also seen as a part of a removal system (40) is the conveyance or routing means (34) and charcoal storage means (36).

Control of removal means (45) is effected by temperature sensing means, e.g., thermocouples or other recognized temperature sensing devices, positioned in the reactor chamber (30) where the temperature sensing means has an output received by a controller for a delivery means (16). In the preferred embodiment temperature sensing means is provided by at least one thermocouple (24) at the upper layer (13) and in the preferred embodiment by one or a plurality of thermocouples (24), e.g., in the preferred embodiment by three thermocouples (24) positioned respectively at the upper layer (13), intermediate layer (14) and at the delivery means (16). In the preferred embodiment a thermocouple positioned in the reactor chamber (30) at the intermediate layer (14) will detect a temperature change indicating the rising of the pyrolysis zone and will provide switch means for the control of a motor controlled auger removal means (45) to move the intermediate layer (14) down in the reaction chamber (30); a thermocouple at the top (31) of the reaction chamber (30) will provide high temperature information for safety shutdown of a fuel gas pump (42) thereby terminating air flow and the operation of the system; a third thermocouple at the delivery means (16) provides additional high temperature sensing and safety control for pump (42) control. Circuit interconnections from one or a plurality of thermocouples to controllers are not shown and are not claimed herein as inventive elements of this disclosure.

It is noted that the charcoal moved from the lower layer (15) will be may be in the range of 600-700 degrees F. Hence this removed charcoal must be contained in an environment which is essentially oxygen free, lest it combusts, until it has cooled. Conveyance or routing means (34) may be auger via piping, conveyor or other such device. Eventual charcoal storage, not shown, may be, for example, bins, trucks, and other such containers suitable for storage or transport to a processing facility.

Prior to initiation of operation, the reaction chamber (30) lower layer (15) is filled with devolatilized charcoal. The devolatilized charcoal is substantially uniform in size and configuration, although the particular size of the charcoal will depend to an extent on the size of the reaction chamber. The lower layer (15) of the charcoal production bed (10) is then ignited, typically, but not necessarily, at or near the lower layer top (33) thereof by ignition means, e.g., a torch, electric start, or similar device. Following ignition of the lower layer top (33), biomass (20) is added forming the upper layer (13) and atmospheric air (50) is moved downwardly through the reaction chamber (30) and production bed (10) by means of a pump (42) which is typically located in fuel gas outlet means (43) line so that air (50) is drawn into and through the reaction chamber (30) from the atmosphere above the reaction chamber (30) in that the pressure in the reaction chamber (30) is less than atmospheric. The intermediate layer (14) forms the pyrolysis zone as air (50) is drawn through the production bed (10). Alternatively, a source of pressurized air may be used at the top (31) of the reaction chamber (30) to force air (50) through the reaction chamber (30) and out the outlet means (43).

It is important for tar-free operation of the invention that the combustion reaction in the pyrolysis zone be substantially homogeneous over the cross-sectional area of the reaction chamber (30). This means that the temperature profile across the pyrolysis zone (14), over the cross-section of the reaction chamber (30), should be substantially uniform, so that there are no hot spots or channels in the pyrolysis zone (14). Maintaining a homogeneous intermediate layer (pyrolysis zone) (14) results in the intermediate layer (14) being relatively thin, no matter what the size of the reaction chamber (30). Any tars which are produced in such an intermediate layer (14) are rather light in weight and are completely broken down by the hot lower layer (15) charcoal bed below the intermediate layer (14).

The pyrolysis reaction is homogeneous in the preferred embodiment shown largely because the airflow through the reaction chamber (30) is substantially uniform over the cross-sectional area of the chamber (30), particularly over the pyrolysis zone (14). Thus, a uniform pressure exists over the cross-sectional area of the chamber (30) in the embodiment shown. To insure that this occurs, the structure by which air (50) is provided to the reaction chamber (30) should not be such as to channel air into the reaction chamber (30), such as occurs with tuyeres, for instance. Air (50) must be permitted to disperse evenly over the top (31) of the biomass (20) raw fuel head upper layer (13) and to be drawn down uniformly through the head or upper layer (13). Further, the size of both the biomass (20) particles, and the charcoal in the lower layer (15) of the charcoal production bed (10) should be somewhat uniform in size. Excessive "input dust", i.e., more than 10%-25% or so, comprised, for example of fine biomass (20) particles, will likely have a detrimental affect on the operation of the invention. Uniform biomass (20) particle size helps to insure a uniformity of airflow through the chamber (30), at least over the cross-sectional area of the intermediate layer (14). This in turn assists in maintaining a uniform temperature profile over the cross-sectional area of the reaction chamber (30) in the vicinity of the intermediate layer (14), which minimizes localized hot spots and/or channels in the intermediate layer (14), thus resulting in a homogeneous combustion of the biomass (20) throughout the intermediate layer (14).

It should be understood that additional techniques, perhaps involving screens or other gas dispensing devices, may be used to insure uniformity of airflow through the chamber and a uniform temperature profile. Further, although atmospheric air has been used as an example of the gas which is moved through the chamber, it should be understood that other gases, including oxygen-enriched atmospheric air, or pure oxygen, could be used.

The establishment of a intermediate layer (14) with homogeneous combustion may be assisted by a biomass leveling means (52) provided for example by a cone (52) fixed by cone affixing means at reactor chamber top (31). Prior art demonstrated stirring of the lower layer (15) of the charcoal production bed (10) following ignition. It is seen that stirring degraded the charcoal into fines and is counterproductive to the production of charcoal of usable particle size. As mentioned above, the resulting intermediate layer (14) is relatively thin, regardless of the size of the reaction chamber (30), and has a temperature of approximately 900 degrees C. Typically, the time necessary for uniform ignition of the lower layer (15) of the charcoal production bed (10), and for establishment of the intermediate layer (14), is very short, i.e. a few minutes. After the intermediate layer (14) has been established, biomass (20) is fed into the reaction chamber (30), into the area of the intermediate layer (14) on top of the lower layer (15), so that three zones are established in the chamber; specifically, the thin, hot intermediate layer (14) between the head of cool, unreacted biomass (20) at the upper layer (13) and the lower layer (15).

The biomass (20) particles, once they reach the intermediate layer (14), are reacted by the high temperature to produce charcoal and essentially tar-free fuel gas. The temperature of the exiting gas is typically 50 degrees C. to 100 degrees C. below the temperature of the intermediate layer (14), depending on radiation loses. The fuel gas is essentially tar-free because there are no localized inhomogeneities in the combustion in the intermediate layer (14), such as hot or cool channels, through which the tars from the biomass (20) particles could otherwise escape and combine into heavy tars. With homogeneous combustion in the intermediate layer (14), any tars emanating from the biomass (20) particles are light, and the tar molecules are small. These light tars, in the absence of channels or a long intermediate layer (14) are then reacted by the catalytic action of the hot charcoal bed to form carbon monoxide and hydrogen. Thus, the gas output of applicant's invention is reliably tar-free.

As the biomass (20) particles move through the intermediate layer (14), which is typically at a temperature of approximately 900 degrees C. but which can operate effectively over a temperature range of 750 degrees C. to 1000 degrees C., fuel gas is produced and a devolatilized char is left behind. Thus, the boundary line between the intermediate layer (14) and the lower layer (15) is where the biomass (20) particles have been reduced to devolatilized char.

After a short period of operation, the temperature of the lower layer (15) becomes quite hot, typically in the range of 800 degrees C. to 950 degrees C. Any tars which do escape from the intermediate layer (14), which are light, as explained above, are broken down by passage through the hot lower layer (15) of the charcoal production bed (10) with resulting fuel gas exiting through outlet means (43) line. However, inhomogeneities in the intermediate layer (14) result in the volatilized gases polymerizing into large, heavy molecules forming clinkers. Additionally, where biomass (20) of high slicia content is used, the operating temperature of the intermediate layer (14) should be controlled to the lower area of the temperature range at about 800 degrees C. Clinkers are particularly susceptible to formation where the biomass (20) is largely comprised of sclicia including grasses, straw and hay. Where such biomass (20) is used temperature control is critical. Temperature control in the preferred embodiment is by manual control of the pump (42). Those of ordinary skill will recognize that temperature sensing and valve control is readily available in the industry. Ash and other fines which are created by the operation of the system of the present invention are carried out with the gas and removed by filter (41), which is in the preferred embodiment is a bubbler tank comprised of a tank of water through which the fuel gas is "bubbled". The filter (41) may, for instance, be a cyclone separator and other separator or filtering means as recognized by those of ordinary skill in filtering arts.

Because the intermediate layer (14) is relatively thin, and substantially homogeneous in reaction, ignition and initiation of operation of the gasifier may be accomplished rapidly, typically much faster than with conventional gasifiers. The unit is also very responsive to changes in demand. The volume of fuel gas (44) output from the gasifier is proportional to the quantity of air (50) flow through the unit, as a change in the air-flow causes a corresponding change in the rate of biomass (20) fuel consumed, and hence, the amount of gas (44) produced.

Another advantage of the homogeneous intermediate layer (14) described above is that the unit is stable in operation, i.e. it produces a usable, tar-free gas (44) output over a relatively wide range of input and output demands. Various kinds of material may be used as biomass (20) input, including wood, straw, and other organic materials, as long as the above size and configurational requirements are observed. The unit is to an extent self-correcting in operation. If an inhomogeneity occurs, additional heat will typically be produced in the vicinity of that inhomogeneity. The additional heat then disperses over the entire intermediate layer (14), tending to disperse the inhomogeneity.

The homogeneity of the reaction of the intermediate layer (14), including the substantially uniform temperature profile, contributed to by the substantial uniformity in size and configuration of the biomass (20) and the uniformity in air (50) flow over the cross-sectional area of the reaction chamber (30), substantially eliminates hot spot channels which characterize the operation of previous gasifiers. Any tars generated in the intermediate layer (14) of the gasifier disclosed herein, are lightweight, small molecules, as described above, and are broken down in a catalytic reaction by contact with the devolatilized charcoal in the hot charcoal bed.

Even with a homogeneous radiation condition over the cross-section of the intermediate layer, however, the gasifier can be over-driven to the extent that channels are created in the pyrolysis zone and the charcoal production bed (10), resulting in tars and clinkering. Thus, the velocity of the air (50) moving through the unit is important to proper operation of the gasifier. In some instances, the gasifier is more tolerant of differences in size of the biomass (20), when the air (50) velocity is low. As the velocity of the air (50) increases, size uniformity of the biomass (20) input becomes more significant. The inventors have found that a velocity of 0.27 cubic ft. of air per minute per sq. inch of cross-sectional area provides a good output without overdriving the unit. A reasonable range of air (50) velocity including the above value will provide satisfactory results.

With certain kinds of biomass (20) input, the relative dimensions of the three zones will remain substantially stable within the chamber (30), with the consumption of charcoal occurring at approximately the same rate as char is produced from the fuel pellets in the pyrolysis zone. Such a circumstance is undesirable relative to the goal of charcoal production. With most types of biomass (20) fuel inputs, such as dry wood pellets, more charcoal will be produced by the pyrolysis reaction then is consumed in the charcoal bed. In such a case, the level of the charcoal bed gradually rises, raising the pyrolysis zone. At some point then, charcoal must be removed from the chamber if proper operation is to continue. The excess charcoal can be removed in a number of ways, either mechanically, or by changing fuel to one with a high moisture content so that more charcoal is consumed than is produced by pyrolysis, or by the addition of water or steam to the reaction chamber.

Figure 3:
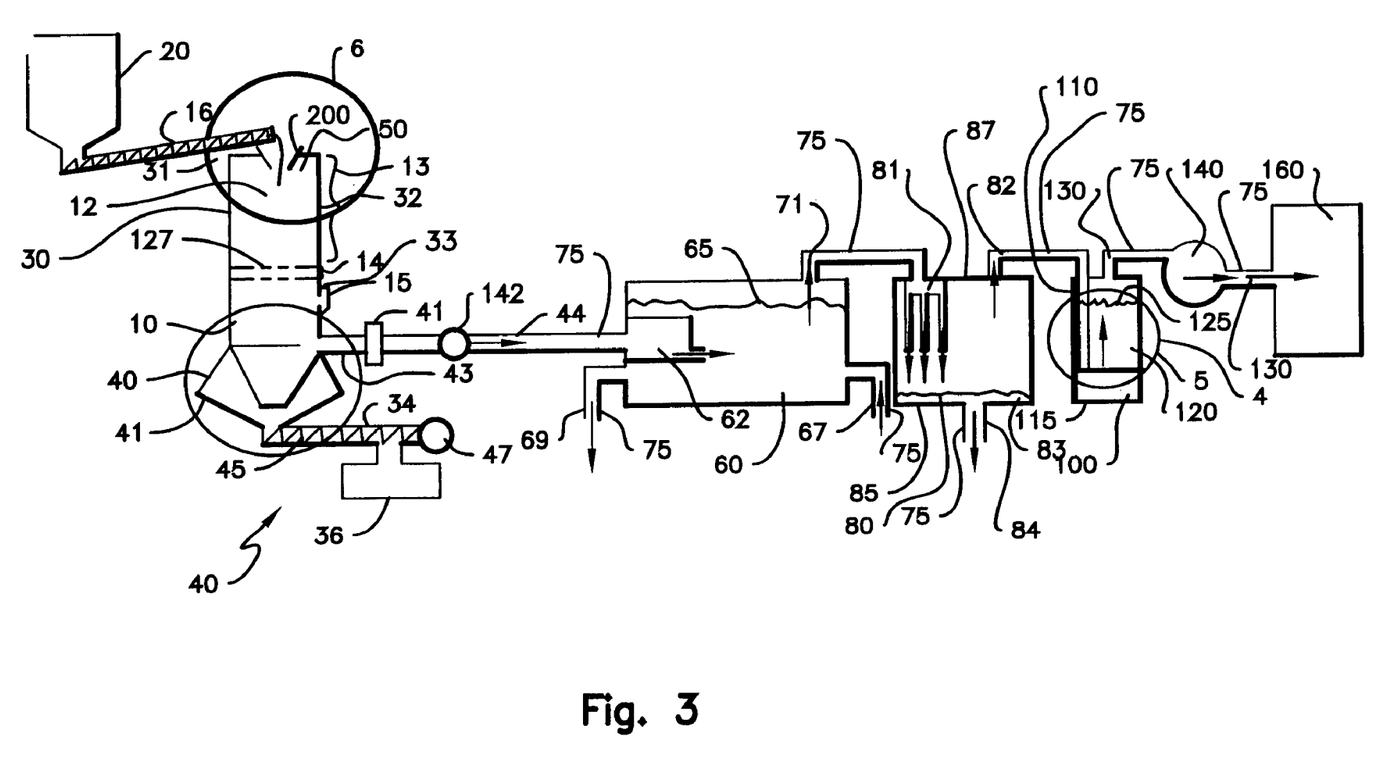
FIG. 3 is a flow diagram showing the fuel gas output (44) from the invention of FIG. 1. Illustrated is the introduction of hot fuel gas (44) into a heat exchanger means (60) and into a water or coolant reservoir (65) with the exhaust of the cooled fuel gas seen as output from water or coolant reservoir (65) directed to a demister means (80) followed by directing the demister output (82) to a fuel conditioner means (100) where said fuel conditioner output (130) is stored or combusted in an engine means (140).

FIG. 3 illustrates the process of conditioning fuel gas (44) for consumption in a combustion engine or for storage. The Fuel Gas (44) output is approximately 1000 degrees F. Disclosed here is the conditioning of the fuel gas (44) for use in a combustion engine. Hot fuel gas (44) is directed into a heat exchanger means (60) having water or coolant supply inlet (67) and water or coolant discharge (69). Heat exchanger means (60), in the preferred embodiment is the direction of the hot fuel gas (44) into a heat exchanger tank (60) containing water (65) wherein the hot fuel gas (44) bubbles through the water (65) to be exhausted from the heat exchanger tank (60) at a heat exchanger tank exhaust (71). Heat exchanger means (60) may be supplemented by a supplemental heat exchanger means (62) comprising structure from generally recognized heat exchanger means including but not limited to a tube heat exchanger wherein the hot fuel gas (44) is received into a supplemental heat exchanger means (62) which is positioned within the heat exchanger tank (60) and is in fluid contact with the heat exchanger tank (60) contents, including as indicated in this application, water (65) with the cooled fuel gas (44) then exhausted at a heat exchanger tank exhaust (71). Those of ordinary skills in the heat exchanger arts will recognize other heat exchanger structures equivalent to a tube heat exchanger.

Figure 4:
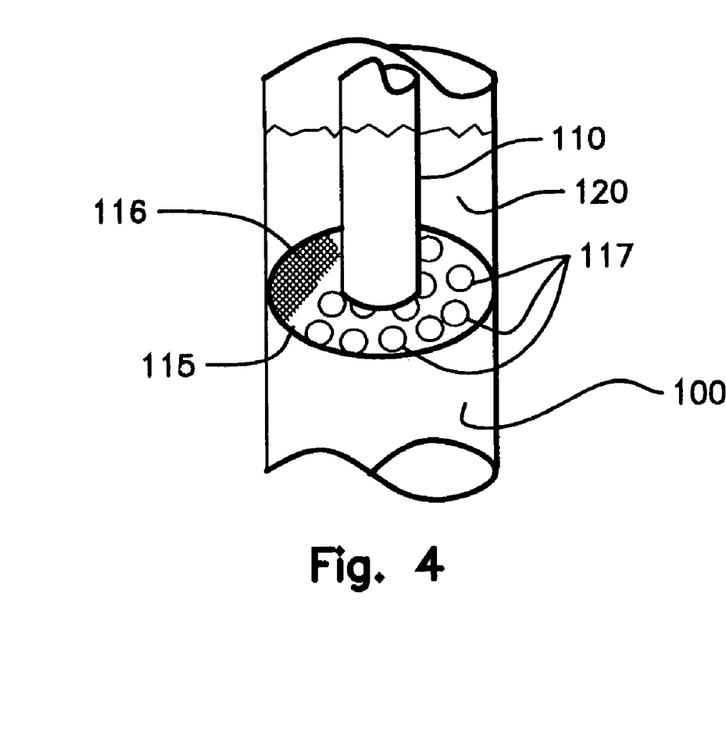
FIG. 4 and FIG. 5 illustrates details 4 and 5 from FIG. 3 showing an aspect of the fuel conditioner means (100).
Figure 5:
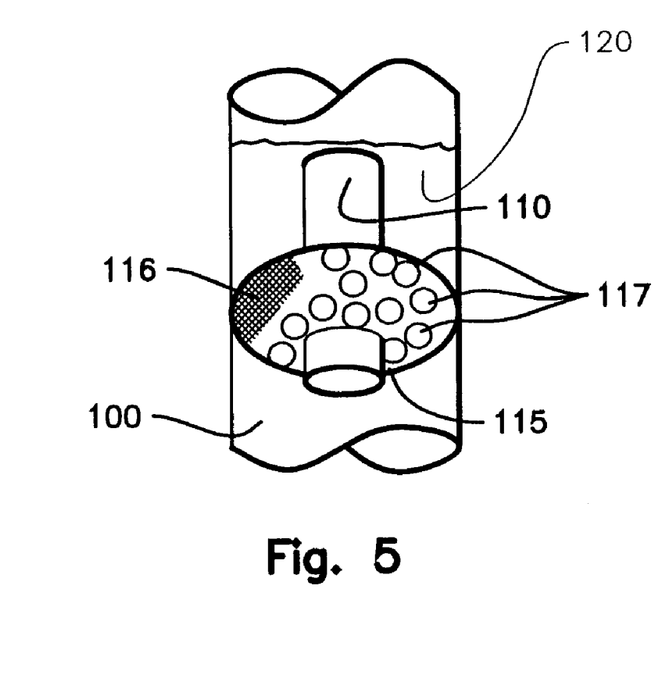

The output from the heat exchanger tank exhaust (71) is a combination of water vapor and fuel gas (44) and is directed then into a demister means (80) at a demister input (81). The demister means (80) accumulates some portion of the water vapor by condensation forming condensate (83). In the preferred embodiment the demister means (80) is comprised of the input via at least one tube (81) and, as is represented in FIG. 3, a flow diagram, a plurality of tubes 1 . . . n (81) or other equivalent means with the condensate (83) accumulated in the demister means (80) and with the condensate (83) periodically drained from the demister means (80) by a condensate drain means (84) comprised generally of a valve and piping means discharging into a reservoir or other place for discharge of the condensate (83). The fuel conditioner means input (110), is then directed through bubble forming means (115) into and through a fuel conditioner means (100) containing fuel means (120). Bubble forming means (115) is provided, in the preferred embodiment, by directing the fuel conditioner input means (110) via pipe or tube means (110) to and through a grid (116) formed of fine wire mesh or a plate with at least one aperture (117) as is seen in FIGS. 4 and 5. Fuel means (120) includes but is not limited to diesel, peanut oil, vegetable oils and other combustible substances as will be recognized by those of ordinary skill in the arts as combustion engine fuels. The fuel conditioner output (130) will be a mixture of fuel gas (44) and fuel means (120) which is exhausted via pump means (140) exerting a vacuum at the fuel conditioner output (130). Fuel conditioner output (130) is directed to a storage or combustion at an engine means (160).

Valve means, not shown in FIG. 3, controls the water or coolant supply inlet (67) and water or coolant discharge (69) and the condensate drain (84). Pipe or tube means (75) provides fluid communication from fuel gas (44) input to heat exchanger means (60), between heat exchanger means (60) and demister means (80); between demister means (80) and fuel conditioner means (100) and between fuel conditioner means (100) and storage or engine means (160).

The fuel conditioner output (130), a mixture of fuel gas (44) and fuel means (120), will be, in the preferred embodiment, in the range of 5% to 20% diesel with the balance comprised of fuel gas (44). With a combination of approximately 3.8% diesel and 96.2% fuel gas (44), substantial pinging has been experienced. It has been noted that controlled delivery of diesel, to the cylinders of a diesel engine, lessens or stops pinging when each cylinder receives the same diesel concentration in the fuel gas (44) and fuel means (120). Operation of diesel engines is difficult when the diesel concentration in the conditioned fuel gas (44) is below 5% diesel. The preferred embodiment of the output of the fuel conditioner output (130) will be with diesel in the range of 5% to 10% and fuel gas (44) at 95% to 90%. The use of diesel and fuel gas (44), forming the conditioned fuel gas (130) requires lower compression.

The conditioned fuel gas (130), as fuel for diesel engine means (160), eliminates the need for fuel injectors due to the diesel content of the conditioned fuel gas (130). Testing demonstrates that the conditioned fuel gas (130) also functions with spark ignition combustion engine means (160). Use of the conditioned fuel gas (130) with diesel engine means (160) also eliminates the need for glow plugs for ignition when the ratio of diesel is increased in the conditioned fuel gas (130). Alternative operations may commence with the starting of the engine means (160) with traditional fuels with injection and glow plug means, with injection and glow plug mean deactivated when the conditioned fuel gas (130) is introduced. The conditioning with diesel, at the fuel conditioner means (100) also acts to remove tars which may be transferred with the fuel gas (44). The conditioned fuel gas (130) may be introduced directly into the engine intake manifold.

The water or coolant discharge (69) where the coolant is water, is found to have concentrations of chemicals supportive of increased growth of plants. It is understood that the chemicals introduced into the water or coolant discharge (69) includes potassium. Experimentation has demonstrated increased growth of plants when watered with the water or coolant discharge (69).

Figure 6:
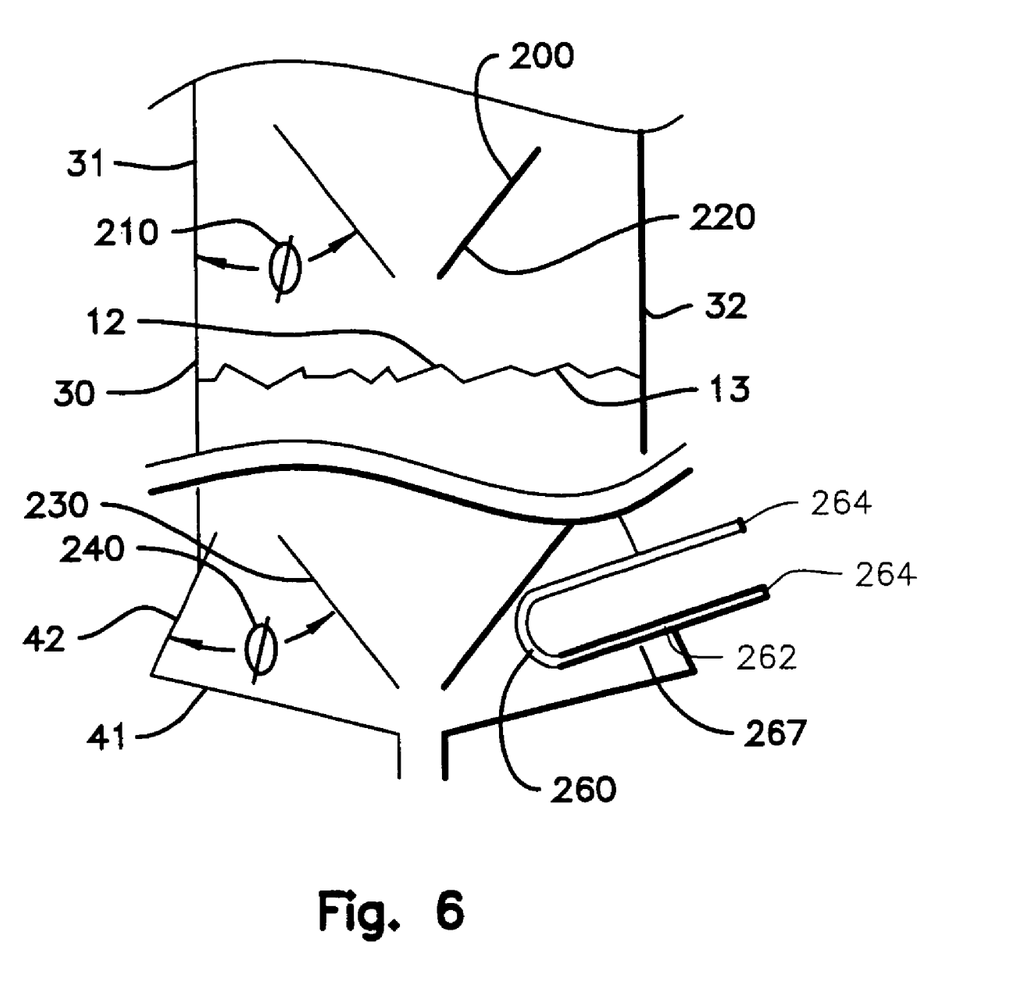
FIG. 6 is a detail from FIG. 1, showing the upper layer (13) at a upper layer center (12), proximal a reaction chamber wall (32) and proximal the top (31). Seen is a funnel means (200), the lower layer (15), the charcoal removal system (40), the walls of the charcoal removal system (42) the removal means (45). Also illustrated is a charcoal discharge funnel means (230) having a slope, (240) and the funnel means (200) having a slope (210).

It is noted, by reference to FIG. 6 as a detail from FIG. 1, in the process of producing charcoal and fuel gas, that the upper layer (13) at a upper layer center (12) may tend to drop in level relative to the upper layer (13) proximal a reaction chamber wall (32) and proximal the top (31). Introduction of biomass (20) into a funnel means (200), will direct biomass (20) toward the upper layer center (12) thereby reducing the tendency of dropping in level at the upper layer center (12). A similar obstructing event occurs at the discharge of charcoal from the lower layer (15) to the charcoal removal system (40). The charcoal from the lower layer (15) falls into the charcoal removal system (40) and tends, toward the walls of the charcoal removal system (42) to stack and not readily advance toward the removal means (45). The introduction of a charcoal discharge funnel means (230) intermediate the lower layer (15) and the removal means (45), directs the charcoal away from the walls (42) of the charcoal removal system (40) and toward the removal means (45). The slope, θ(210, 240) of the funnel means (200) at the funnel side (220), relative to a vertical, and of the charcoal discharge funnel means (230) at the charcoal discharge funnel slope (240), in the preferred embodiment, will be greater than approximately 45 degrees and are preferred at approximately 60 degrees. Both the funnel means and the charcoal discharge funnel means (230) are primarily inverted conical in structure. Other cross sections will be equivalent as will be appreciated by those of ordinary skill in the funnel arts.

The high temperature of collecting charcoal at the charcoal removal system (40) and charcoal collection means (41) provides heat to be captured by introduction of a charcoal heat exchanger means (260) provided, in the preferred embodiment by at least one tube (262) penetrating the charcoal collection means (41) arena via heat exchanger ports (264) at the charcoal removal system wall (42).

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A continuous process for producing charcoal from biomass input material in which the production of charcoal is maximized and the consumption of charcoal is minimized, the process excluding updrafts and the use of steam comprising the steps of:
   a. establishing a charcoal production bed having a dry biomass upper layer having a top and a charcoal lower layer having a lower layer top; an intermediate layer pyrolysis zone positioned between the upper layer and the lower layer; the charcoal production bed positioned in a single reaction chamber;
   b. igniting the lower layer top with ignition means; establishing a pyrolysis zone at the intermediate layer;
   c. moving oxygen-containing gas downwardly through the charcoal production bed to sustain the pyrolysis reaction in the intermediate layer and to maintain the temperature of the charcoal in the lower layer, wherein the pyrolysis volatiles from the intermediate layer move downwardly through the hot charcoal in the lower layer, resulting in tar-free fuel gas, which exits from the outlet means, and;
   d. excluding an updraft from below the charcoal bed, and;
   e. excluding the introduction of steam into the charcoal bed, and;
   f. removing, by removing means, charcoal in the lower layer; regulating the introduction of additional biomass material so that as charcoal is removed, the level of charcoal comprising the lower layer, and hence the level of the pyrolysis zone comprising the intermediate layer, remain substantially constant within the reaction chamber.

2. The process of claim 1, wherein:
   a. maintaining the lower layer at a temperature which is sufficiently high to reduce any tars from the pyrolysis zone intermediate layer to carbon monoxide, hydrogen;
   b. providing the charcoal production bed with an outlet means for fuel gas;
   regulating the additional biomass material by regulating at least the quantity and or the moisture content of the additional biomass material.

3. The process of claim 2, including the step of monitoring the level of the pyrolysis zone in the reaction chamber.

4. The process of claim 3 wherein the monitoring of the level of the pyrolysis zone in the reaction chamber is by thermocouple means.

5. The process of claim 2, including the step of removing the fuel gas from the reaction chamber.

6. The process of claim 1, wherein the temperature of the pyrolysis reaction zone is in the range of 800.degree. C.-1 000.degree.

7. The process of claim 1, wherein the charcoal lower layer is substantially devolatilized.

8. The process of claim 1, wherein the charcoal lower layer is substantially uniform in size.

9. The process of claim 2, wherein:
 a. establishing the charcoal production bed is commenced by adding a charge of charcoal at the lower layer of the reaction chamber.

* * * * *